(12) United States Patent
Thuilliez et al.

(10) Patent No.: US 11,155,656 B2
(45) Date of Patent: Oct. 26, 2021

(54) FUNCTIONAL ETHYLENE AND 1,3-BUTADIENE COPOLYMER

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Vincent Lafaquiere, Clermont-Ferrand (FR); Leyla Pehlivan, Clermont-Ferrand (FR); Benoît MacQueron, Paris (FR); Christophe Boisson, Tramoyes (FR); Franck D'Agosto, Genas (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/619,864

(22) PCT Filed: Jun. 6, 2018

(86) PCT No.: PCT/FR2018/051305
§ 371 (c)(1),
(2) Date: Dec. 5, 2019

(87) PCT Pub. No.: WO2018/224774
PCT Pub. Date: Dec. 13, 2018

(65) Prior Publication Data
US 2020/0140587 A1 May 7, 2020

(30) Foreign Application Priority Data
Jun. 8, 2017 (FR) ...................... 17/55107

(51) Int. Cl.
| | | |
|---|---|---|
| *C08F 4/54* | (2006.01) | |
| *C08F 236/04* | (2006.01) | |
| *C08F 236/06* | (2006.01) | |
| *C08F 236/08* | (2006.01) | |
| *C08F 210/02* | (2006.01) | |

(52) U.S. Cl.
CPC ............ *C08F 210/02* (2013.01); *C08F 4/545* (2013.01); *C08F 236/04* (2013.01); *C08F 236/06* (2013.01); *C08F 236/08* (2013.01); *C08F 2810/40* (2013.01)

(58) Field of Classification Search
CPC ...... C08F 4/545; C08F 236/04; C08F 236/06; C08F 236/08
See application file for complete search history.

(56) References Cited

U.S. PATENT DOCUMENTS

| | | | | |
|---|---|---|---|---|
| 6,992,147 | B1 * | 1/2006 | Ozawa | .................... C08C 19/44 |
| | | | | 525/105 |
| 2009/0182104 | A1 | 7/2009 | Thuilliez et al. | |
| 2010/0022725 | A1 | 1/2010 | Thuilliez et al. | |
| 2014/0350138 | A1 * | 11/2014 | Cladiere | ............... B60C 1/0016 |
| | | | | 523/156 |

FOREIGN PATENT DOCUMENTS

| | | |
|---|---|---|
| FR | 2893028 A1 | 5/2007 |
| FR | 2893029 A1 | 5/2007 |
| FR | 3044241 A1 | 6/2017 |

OTHER PUBLICATIONS

International Search Report and Written Opinion corresponding to PCT/FR2018/051305 dated Oct. 17, 2018.

\* cited by examiner

*Primary Examiner* — Caixia Lu
(74) *Attorney, Agent, or Firm* — Dickinson Wright PLLC

(57) ABSTRACT

An ethylene/1,3-butadiene copolymer containing ethylene units, butadiene units and UD units of cyclic, 1,2-cyclohexanediyl structure, and bearing, at one of its chain ends, an alkoxysilyl or silanol function, functional group $F^1$ is provided. The UD units of cyclic structure are of the following formula:

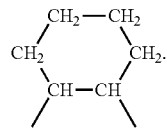

33 Claims, No Drawings

FUNCTIONAL ETHYLENE AND 1,3-BUTADIENE COPOLYMER

This application is a 371 national phase entry of PCT/FR2018/051305 filed on 6 Jun. 2018, which claims benefit of French Patent Application No. 1755107, filed 8 Jun. 2017, the entire contents of which are incorporated herein by reference for all purposes.

BACKGROUND

1. Technical Field

The present invention relates to an ethylene/1,3-butadiene copolymer comprising 1,2-cyclohexanediyl 6-membered saturated cyclic moieties, and bearing an alkoxysilyl or silanol function at the chain end.

2. Related Art

It is always advantageous to have new polymers available in order to broaden the range of materials already available and to improve the properties of already existing materials. Among the approaches to new polymers, mention may be made of the modification of polymers.

The modification to provide an alkoxysilyl or silanol function at one end of the chain of a polymer is widely described for polymers synthesized by anionic polymerization. The modification of the ends of the polymer chains produced by anionic polymerization rests upon the living nature of the polymer chains, the living nature being expressed by the absence of transfer reaction and termination reaction during the polymerization reaction. Living polymerization is also characterized by the fact that a single polymer chain is produced per mole of initiator or per metal. The chain-end modification of a polymer by an alkoxysilane or silanol function is much less described for polymers synthesized by catalytic polymerization using a heterogeneous Ziegler-Natta catalytic system. By way of example, mention may be made of document WO 2001034658 which describes the functionalization of a polybutadiene having a high content of cis-1,4-bonds prepared by coordination catalysis using a catalytic system comprising a neodymium carboxylate.

Polymerization by means of a catalytic coordination system comprising a metallocene makes it possible to attain ethylene/1,3-butadiene copolymers. But this polymerization is based on chemistry different from anionic polymerization and from polymerization by Ziegler-Natta catalysis. A first difference relates to the catalytic system, for example described in documents EP 1 092 731 B1, WO 2004035639 and EP 1 954 706 B1 which is typically composed of a metallocene and of a cocatalyst, an organomagnesium compound. A second difference relates to the reactions involved which comprise numerous transfer reactions between the metal of the metallocene and the magnesium of the cocatalyst and which also enable the production of a large number of copolymer chains via metallocene metal. A third difference relates to the polymer chains produced which comprise both unsaturated butadiene units and saturated ethylene units, but not exclusively. The polymer chains also contain 6-membered saturated cyclic moieties, in particular 1,2-cyclohexanediyl moieties, resulting from a series of very particular insertions of ethylene and 1,3-butadiene in the polymer chain. Another difference relates to the chemical structure of the chain end to be modified, which structure results from the very specific polymerization mechanism. Reference may for example be made to the document ACS Catalysis, 2016, Volume 6, Issue 2, pages 1028-1036. Owing to the specificity of the species and reactions involved in the synthesis of these copolymers, to date no process exists that enables the modification of these copolymers at the chain end and subsequently a reduction in hysteresis of silica-reinforced rubber compositions containing these copolymers.

Owing to this surprising microstructure, ethylene/1,3-butadiene copolymers, have a different rigidity/hysteresis compromise from polydiene elastomers or 1,3-diene/styrene copolymers synthesized by anionic polymerization or by Ziegler Natta polymerization. However, some of these diene copolymers rich in ethylene units are rigid and give the rubber compositions a rigidity that may prove too high for certain applications, for example in tires. There is therefore an interest in producing new copolymers which also impart a lower rigidity to the rubber compositions.

SUMMARY

The objective of the present invention is to propose a process for synthesizing a polymer which makes it possible to solve the problems mentioned. The objective of the present invention is also to propose a polymer which makes it possible to solve the problems disclosed.

Thus a first subject of the invention is an ethylene/1,3-butadiene copolymer comprising ethylene units, butadiene units and UD units of cyclic structure of formula (I) and bearing, at one of its chain ends, an alkoxysilyl or silanol function, functional group $F^1$.

(I)

Another subject of the invention is a process for synthesizing the copolymer in accordance with the invention which comprises the following steps:

a) the copolymerization of a monomer mixture of ethylene and 1,3-butadiene in the presence of a catalytic system comprising an organomagnesium compound and a metallocene comprising the moiety of formula (II)

Met being a group 4 metal atom or a rare-earth metal atom, $P^1$ being a group that bridges the two groups $Cp^1$ and $Cp^2$, and that comprises a silicon or carbon atom, $Cp^1$ and $Cp^2$, which are identical or different, being selected from the group consisting of the fluorenyl group, substituted fluorenyl groups, the cyclopentadienyl group, substituted cyclopentadienyl groups, the indenyl group and substituted indenyl groups.

b) the reaction of a functionalizing agent, a compound of formula (III), with the copolymer obtained in step a),

the $Fc^1$ symbols, which are identical or different, representing an alkoxy group or a halogen atom, the $Rc^2$ symbols, which are identical or different, representing a hydrogen atom, a hydrocarbon chain or a hydrocarbon chain substituted by a chemical function $Fc^2$, g being an integer ranging from 0 to 2, c) if necessary, a hydrolysis reaction.

I. DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The compounds mentioned in the description can be of fossil or biobased origin. In the latter case, they can partially or completely result from biomass or be obtained from renewable starting materials resulting from biomass. Monomers are concerned in particular.

The copolymer in accordance with the invention has the essential feature of being an ethylene/1,3-butadiene copolymer, which means that the monomer units of the copolymer are those resulting from the polymerization of ethylene and 1,3-butadiene.

The ethylene units, referred to as UA units, result from the insertion of the ethylene monomer into the copolymer and have the moiety $—(CH_2—CH_2)—$. The butadiene units result from the insertion of the 1,3-butadiene monomer into the copolymer via a 1,4 or 2,1 insertion and have the respective moiety $—CH_2—CH=CH—CH_2—$ and $—CH_2—CH(CH=CH_2)—$, respectively referred to as UB and UC units.

The chain of the copolymer also contains UD units of cyclic, 1,2-cyclohexanediyl structure, of formula (I), which result from a very particular insertion of the ethylene and 1,3-butadiene monomers into the copolymer.

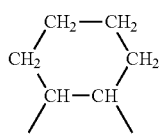

(I)

By definition, each of the molar percentages of the ethylene units, butadiene units and UD units of cyclic structure in the copolymer is strictly greater than 0.

According to any one of the embodiments of the invention, the ethylene units preferably represent at least 50 mol %, more preferentially at least 65 mol % of all of the monomer units of the copolymer.

According to one particular embodiment, the copolymer also comprises UE units of cyclic, 1,4-cyclohexanediyl structure, of formula (I-1), which result from an equally very particular insertion of the ethylene and 1,3-butadiene monomers into the copolymer.

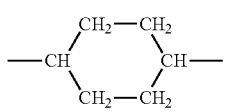

(I-1)

Preferably, the units present in the copolymer are present in the molar percentages indicated below

| UA) | $—CH_2—CH_2—$ | according to a molar percentage of m % |
|---|---|---|
| UB) | $—CH_2—CH=CH—CH_2—$ | according to a molar percentage of n % |
| UC) | $—CH_2—CH(CH=CH_2)—$ | according to a molar percentage of o % |
| UD) | (1,2-cyclohexanediyl structure) | according to a molar percentage of p % |
| UE) | (1,4-cyclohexanediyl structure) | according to a molar percentage of q % | m, n, o, p and q being numbers ranging from 0 to 100, $m \geq 50$ $n+o>0$ $p>0$ $q \geq 0$, the respective molar percentages of m, n, o, p and q being calculated on the basis of the sum of $m+n+o+p+q$, which is equal to 100.

More preferentially, $0<o+p \leq 25$ $o+p+q \geq 5$ $n+o>0$ $q \geq 0$, the respective molar percentages of m, n, o, p and q being calculated on the basis of the sum of $m+n+o+p+q$, which is equal to 100.

Even more preferentially, the copolymer has at least one of the following criteria, and preferentially all of them:

$m \geq 65$ $n+o+p+q \geq 15$, preferably $n+o+p+q \geq 20$ $12 \geq p+q \geq 2$ $1 \geq n/(o+p+q)$ when q is non-zero, $20 \geq p/q \geq 1$.

Advantageously, q is equal to 0.

According to any one of the embodiments of the invention, the copolymer preferably has a number-average molar mass (Mn) of at least 5000 g/mol, more preferentially of at least 60 000 g/mol, minimum value particularly advantageous for a use of the copolymer as an elastomer for example in a rubber composition for a tire. Generally, its number-average molar mass does not exceed 1 500 000 g/mol; beyond this value, the viscosity of the copolymer may make the use of the copolymer difficult. It preferably has a dispersity Đ, equal to Mw/Mn (Mw being the weight-average molar mass), of between 1.10 and 3.00. The Mn, Mw and Đ values are measured according to the method described in section II.1.

The copolymer in accordance with the invention also has another essential feature of bearing, at one of its chain ends, an alkoxysilane function or a silanol function. In the present application, the alkoxysilane or silanol function borne at one of the ends is referred to in the present application by the name the functional group $F^1$.

According to one embodiment of the invention, the functional group $F^1$ is attached directly via a covalent bond to the terminal unit of the copolymer, which means to say that the silicon atom of the function is directly bonded, covalently, to a carbon atom of the terminal unit of the copolymer. The terminal unit to which the functional group $F^1$ is directly attached preferably consists of a methylene bonded to an ethylene unit or to a UD unit, the Si atom being bonded to the methylene. A terminal unit is understood to mean the last unit inserted in the copolymer chain by copolymerization, which unit is preceded by a penultimate unit, which is itself preceded by the antepenultimate unit.

According to a first variant of the invention, the functional group $F^1$ is of formula (III-a)

$$\text{Si}(OR^1)_{3-f}(R^2)_f \qquad\qquad\qquad \text{(III-a)}$$

the $R^1$ symbols, which are identical or different, representing an alkyl, the $R^2$ symbols, which are identical or different, representing a hydrogen atom, a hydrocarbon chain or a hydrocarbon chain substituted by a chemical function $F^2$, f being an integer ranging from 0 to 2.

In the formula (III-a), the $R^1$ symbols are preferentially an alkyl having at most 6 carbon atoms, more preferentially a methyl or an ethyl, more preferentially still a methyl.

If 3-f is greater than 1, the $R^1$ symbols are advantageously identical, in particular methyl or ethyl, more particularly methyl.

According to a second variant of the invention, the functional group $F^1$ is of formula (III-b)

$$\text{Si}(OH)(R^2)_2, \qquad\qquad\qquad \text{(III-b)}$$

the $R^2$ symbols, which are identical or different, representing a hydrogen atom, a hydrocarbon chain or a hydrocarbon chain substituted by a chemical function $F^2$.

Among the hydrocarbon chains represented by the $R^2$ symbols in the formulae (III-a) and (III-b), mention may be made of alkyls, in particular those having at most 6 carbon atoms, preferentially methyl or ethyl, more preferentially methyl.

Among the hydrocarbon chains substituted by a chemical function $F^2$ represented by the $R^2$ symbols in the formulae (III-a) and (III-b), mention may be made of alkanediyl chains, in particular those comprising at most 6 carbon atoms, very particularly the 1,3-propanediyl group, the alkanediyl group bearing a substituent, the chemical function $F^2$, in other words, one valence of the alkanediyl chain for the function $F^2$, the other valence for the silicon atom of the silanol or alkoxysilane function.

In the formulae (III-a) and (III-b), a chemical function $F^2$ is understood to mean a group which is different from a saturated hydrocarbon group and which may participate in chemical reactions. Among the chemical functions which may be suitable, mention may be made of the ether function, the thioether function, the primary, secondary or tertiary amine function, the thiol function, the silyl function. The primary or secondary amine or thiol functions may be protected or may not be protected. The protecting group of the amine and thiol functions is for example a silyl group, in particular trimethylsilyl or tert-butyldimethylsilyl group.

Preferably, the chemical function $F^2$ is a primary, secondary or tertiary amine function or a thiol function, the primary or secondary amine or thiol function being protected by a protecting group or being unprotected.

In the formulae (III-a) and (III-b), the $R^2$ symbols, which are identical or different, preferably represent an alkyl having at most 6 carbon atoms or an alkanediyl chain having at most 6 carbon atoms and substituted by the chemical function $F^2$.

Mention may be made, as functional group $F^1$, of the dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethysilyl, 3-(N,N-dimethylamino)propylmethoxymethylsilyl, 3-(N,N-dimethylamino)propylmethoxyethylsilyl, 3-(N,N-dimethylamino)propylethoxymethylsilyl, 3-(N,N-dimethylamino)propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl and 3-thiopropylethoxyethylsilyl groups.

Mention may also be made, as functional group $F^1$, of the silanol form of the functional groups mentioned above which contain one and only one ethoxy or methoxy function, it being possible for the silanol form to be obtained by hydrolysis of the ethoxy or methoxy function.

In this regard, the dimethylsilanol, diethylsilanol, 3-(N,N-dimethylamino)propylmethylsilanol, 3-(N,N-dimethylamino)propylethylsilanol, 3-aminopropylmethylsilanol, 3-aminopropylethylsilanol, 3-thiopropylethylsilanol and 3-thiopropylmethylsilanol groups are suitable.

Mention may also be made, as functional group $F^1$, of the functional groups whether they are in the alkoxy or silanol form, which have been mentioned above and which comprise an amine or thiol function in a form protected by a silyl group, in particular trimethylsilyl or tert-butyldimethylsilyl group.

According to one very preferential embodiment of the invention, the functional group $F^1$ is of formula (III-a) in which f is equal to 1. According to this very preferential embodiment, the groups for which $R^1$ is a methyl or an ethyl, such as for example the dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyl-diethoxysilyl, 3-thiopropyldimethoxysilyl and 3-thiopropyldiethoxysilyl groups, are very particularly suitable. Also suitable are the protected forms of the amine or thiol function of the last 4 functional groups mentioned in the preceding list, protected by a silyl group, in particular trimethylsilyl or tert-butyldimethylsilyl group.

According to one even more preferential embodiment of the invention, the functional group $F^1$ is of formula (III-a) in which f is equal to 1 and $R^1$ is a methyl. According to this even more preferential embodiment, the dimethoxymethylsilyl, dimethoxyethylsilyl, 3-(N,N-dimethylamino)propyldimethoxysilyl, 3-aminopropyldimethoxysilyl and 3-thiopropyldimethoxysilyl groups, and also the protected forms of the amine or thiol function of 3-aminopropyldimethoxysilyl or 3-thiopropyldimethoxysilyl, protected by a trimethylsilyl or a tert-butyldimethylsilyl, are very particularly suitable.

The copolymer in accordance with the invention may be prepared by the process described below.

The process has the essential feature of comprising the following steps (a) and (b), and if need be step (c):

a) the copolymerization of a monomer mixture of ethylene and 1,3-butadiene in the presence of a catalytic system comprising an organomagnesium compound and a metallocene comprising the moiety of formula (II)

$$P^1(Cp^1)(Cp^2)Met \qquad (II)$$

Met being a group 4 metal atom or a rare-earth metal atom, $P^1$ being a group that bridges the two groups $Cp^1$ and $Cp^2$, and that comprises a silicon or carbon atom, $Cp^1$ and $Cp^2$, which are identical or different, being selected from the group consisting of the fluorenyl group, substituted fluorenyl groups, the cyclopentadienyl group, substituted cyclopentadienyl groups, the indenyl group and substituted indenyl groups.

b) the reaction of a functionalizing agent with the copolymer obtained in step a), c) if necessary, a hydrolysis reaction.

Step a) is a copolymerization of a monomer mixture of ethylene and 1,3-butadiene. The copolymerization may be carried out in accordance with patent applications EP 1 092 731, WO 2004035639 and WO 2007054224 using a catalytic system composed of a metallocene and an organomagnesium compound which are used as catalyst and cocatalyst respectively.

A person skilled in the art adapts the polymerization conditions described in these documents so as to achieve the desired microstructure and macrostructure of the copolymer chain. According to any one of the embodiments of the invention, the molar ratio of the organomagnesium compound to the metal Met constituting the metallocene is preferably within a range extending from 1 to 100, more preferentially is greater than or equal to 1 and less than 10. The range of values extending from 1 to less than 10 is in particular more favourable for obtaining copolymers of high molar masses.

A person skilled in the art also adapts the polymerization conditions and the concentrations of each of the reactants (constituents of the catalytic system, monomers) depending on the equipment (tools, reactors) used for carrying out the polymerization and the various chemical reactions. As is known to a person skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The organomagnesium compound is a compound which has at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound has two C—Mg bonds, in the case in point C—Mg—C; the organomagnesium halide has one C—Mg bond.

According to one particularly preferential embodiment of the invention, the organomagnesium compound comprises an alkyl group bonded to the Mg metal atom. In this regard, alkylmagnesium compounds, very particularly dialkylmagnesium compounds, or alkylmagnesium halides, are particularly suitable, such as for example butyloctylmagnesium, butylethylmagnesium and butylmagnesium chloride. More preferentially, the organomagnesium compound is a diorganomagnesium compound. The organomagnesium compound is advantageously butyloctylmagnesium.

As substituted cyclopentadienyl, indenyl and fluorenyl groups, mention may be made of those substituted by alkyl radicals having from 1 to 6 carbon atoms or by aryl radicals having from 6 to 12 carbon atoms. The choice of the radicals is also guided by the accessibility to the corresponding molecules, which are the substituted cyclopentadienes, fluorenes and indenes, because the latter are commercially available or can be easily synthesized.

In the present application, in the case of the cyclopentadienyl group, the 2 (or 5) position denotes the position of the carbon atom which is adjacent to the carbon atom to which the bridge P is attached, whether it is $P^1$ or $P^2$, as is represented in the diagram below.

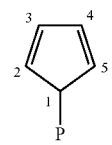

Mention may more particularly be made, as cyclopentadienyl group substituted in the 2 and 5 position, of the tetramethylcyclopentadienyl group.

In the case of the indenyl group, the 2 position denotes the position of the carbon atom which is adjacent to the carbon atom to which the bridge P is attached, whether it is $P^1$ or $P^2$, as is represented in the diagram below.

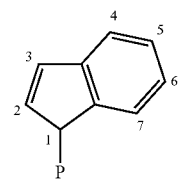

Mention may more particularly be made, as indenyl groups substituted in the 2 position, of 2-methylindenyl or 2-phenylindenyl.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as is represented in the diagram below, the 9 position corresponding to the carbon atom to which the bridge P is attached.

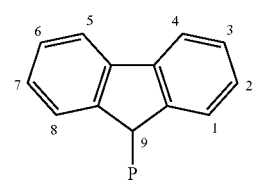

According to a first preferential variant of the process, $Cp^1$ is different from $Cp^2$, $Cp^1$ is selected from the group consisting of substituted fluorenyl groups and the fluorenyl group, and $Cp^2$ is selected from the group consisting of cyclopentadienyl groups substituted at least at positions 2 & 5, indenyl groups substituted at least at position 2, substituted fluorenyl groups and the fluorenyl group.

According to a second preferential variant, $Cp^1$ and $Cp^2$ are identical and are selected from the group consisting of indenyl groups substituted at position 2 substituted fluorenyl groups and the fluorenyl group.

Advantageously, in the formula (II), $Cp^1$ and $Cp^2$ each represent a substituted fluorenyl group or a fluorenyl group, preferably a fluorenyl group. The fluorenyl group is of formula $C_{13}H_8$.

The Met symbol preferably represents a rare-earth metal atom. It is recalled that the rare-earth elements are metals and denote the elements scandium, yttrium and the lanthanides, the atomic number of which ranges from 57 to 71.

In the formula (II), the Met atom is connected to a ligand molecule consisting of the two $Cp^1$ and $Cp^2$ groups connected together by the bridge $P^1$. Preferably, the $P^1$ symbol, denoted under the term bridge, corresponds to the formula $MR^3R^4$, M representing a silicon or carbon atom, preferably a silicon atom, $R^3$ and $R^4$, which are identical or different, representing an alkyl group comprising from 1 to 20 carbon atoms. More preferentially, the bridge $P^1$ is of formula $SiR^3R^4$, $R^3$ and $R^4$ being as defined previously. More preferentially still, $P^1$ corresponds to the formula $SiMe_2$.

According to one preferential embodiment of the invention, the metallocene is of formula (II-1):

$$\{P^1(Cp^1)(Cp^2)Met\text{-}G\}_b \qquad (\text{II-1})$$

in which
  Met represents a rare-earth metal atom,
  the G symbol denoting a halogen atom X selected from the group consisting of chlorine, fluorine, bromine and iodine, or a group comprising the borohydride moiety $BH_4$,
  $Cp^1$, $Cp^2$ and $P^1$ being as defined previously, including according to the preferential variants,
  b being equal to 1 or 2.

Advantageously, in the formula (II-1), $Cp^1$ and $Cp^2$ are identical and are selected from the group consisting of indenyl groups substituted at position 2, substituted fluorenyl groups and the fluorenyl group. Better still, they each represent, in the formula (II-1), a substituted fluorenyl group or a fluorenyl group, preferably a fluorenyl group $C_{13}H_8$.

Whether the metallocene is of formula (II) or (II-1), the Met symbol preferably represents a lanthanide (Ln) atom, the atomic number of which ranges from 57 to 71, more preferentially a neodymium (Nd) atom.

The metallocene may be in the form of a crystalline or non-crystalline powder, or else in the form of single crystals. The metallocene may be in a monomer or dimer form, these forms depending on the method of preparation of the metallocene, as is for example described in applications WO 2007054223 and WO 2007054224. The metallocene may be prepared conventionally by a process analogous to that described in documents EP 1 092 731, WO 2007054223 and WO 2007054224, in particular by reaction, under inert and anhydrous conditions, of the salt of an alkali metal of the ligand with a rare-earth metal salt, such as a rare-earth metal halide or borohydride, or a salt of a group 4 metal in a suitable solvent, such as an ether, for instance diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in solid form.

According to any one of the embodiments described, the metallocene is preferably a lanthanide borohydride metallocene or a lanthanide halide metallocene, in particular a lanthanide chloride metallocene.

According to one particularly preferential embodiment of the invention, the G symbol denotes chlorine or the group of formula (IV)

$$(BH_4)_{(1+c)}\text{-}L_c\text{-}N_x \qquad (\text{IV})$$

in which
  L represents an alkali metal atom selected from the group consisting of lithium, sodium and potassium,
  N represents a molecule of an ether,
  x, which may or may not be an integer, is equal to or greater than 0,
  c, an integer, is equal to or greater than 0.

Any ether which has the ability to complex the alkali metal, in particular diethyl ether and tetrahydrofuran, is suitable as ether.

As metallocene of use for the invention, mention may be made of the metallocenes selected from the group of metallocenes consisting of $[Me_2SiFlu_2Nd(\mu\text{-}BH_4)_2Li(THF)\}_2]$, $[Me_2SiFlu_2Nd(\mu\text{-}BH_4)(THF)]$, $[Me_2SiFlu_2Nd(\mu\text{-}BH_4)]$, $[Me_2Si(2\text{-}MeInd)_2Nd(\mu\text{-}BH_4)]$, $[Me_2Si(C_5Me_4)(Flu)Nd(\mu\text{-}BH_4)]$, $[Me_2SiFlu_2Nd(\mu\text{-}BH_4)_2Li(THF)]$, $[Me_2SiFlu_2Nd(\mu\text{-}BH_4)(THF)\}_2]$ and $[Me_2SiFlu_2Nd(Cl)]$.

In the present application, the Flu symbol represents the fluorenyl group $C_{13}H_8$, the Ind symbol represents the indenyl group, the 2-MeInd symbol represents the indenyl group substituted by a methyl at position 2.

Preferentially, the metallocene is of formula (IV-3a), (IV-3b), (IV-3c) (IV-3d) or (IV-3e).

$$[\{Me_2SiFlu_2Nd(\mu\text{-}BH_4)_2Li(THF)\}_2] \qquad (\text{IV-3a})$$

$$[Me_2SiFlu_2Nd(\mu\text{-}BH_4)_2Li(THF)] \qquad (\text{IV-3b})$$

$$[Me_2SiFlu_2Nd(\mu\text{-}BH_4)(THF)] \qquad (\text{IV-3c})$$

$$[\{Me_2SiFlu_2Nd(\mu\text{-}BH_4)(THF)\}_2] \qquad (\text{IV-3d})$$

$$[Me_2SiFlu_2Nd(\mu\text{-}BH_4)] \qquad (\text{IV-3e})$$

Step b) consists in reacting a functionalizing agent with the copolymer obtained in step a) in order to functionalize the chain end of the copolymer. The functionalizing agent is a compound of formula (III), $$Si(Fc^1)_{4\text{-}g}(Rc^2)_g \qquad (\text{III})$$

the $Fc^1$ symbols, which are identical or different, representing an alkoxy group or a halogen atom,
the $Rc^2$ symbols, which are identical or different, representing a hydrogen atom, a hydrocarbon chain or a hydrocarbon chain substituted by a chemical function $Fc^2$, g being an integer ranging from 0 to 2.

When the $Fc^1$ symbol represents an alkoxy group, the alkoxy group is preferably methoxy or ethoxy. When the $Fc^1$ symbol represents a halogen atom, the halogen atom is preferably chlorine.

According to one preferential embodiment of the invention, at least one of the $Fc^1$ symbols represents an alkoxy group, in particular methoxy or ethoxy. Advantageously, the functionalizing agent is then of formula (III-1)

$$MeOSi(Fc^1)_{3\text{-}g}(Rc^2)_g \qquad (\text{III-1})$$

the $Fc^1$ and $Rc^2$ symbols and g being as defined in the formula (III).

According to one more preferential embodiment, at least two of the $Fc^1$ symbols represent an alkoxy group, in particular methoxy or ethoxy. Advantageously, the functionalizing agent is then of formula (III-2)

$$(MeO)_2Si(Fc^1)_{2-g}(Rc^2)_g \quad (III-2)$$

the $Fc^1$ and $Rc^2$ symbols and g being as defined in the formula (III).

According to one even more preferential embodiment, at least three of the $Fc^1$ symbols represent an alkoxy group, in particular methoxy or ethoxy. Advantageously, the functionalizing agent is then of formula (III-3)

$$(MeO)_3Si(Fc^1)_{1-g}(Rc^2)_g \quad (III-3)$$

the $Fc^1$ and $Rc^2$ symbols being as defined in the formula (III) and g being an integer ranging from 0 to 1.

According to one even more advantageous embodiment, the functionalizing agent is of formula (III-4).

$$(MeO)_3SiRc^2 \quad (III-4)$$

$Rc^2$ being as defined in formula (III).

Among the hydrocarbon chains represented by the $Rc^2$ symbols in the formulae (III), (III-1), (III-2), (III-3) and (III-4) mention may be made of alkyls, preferably alkyls having at most 6 carbon atoms, more preferentially methyl or ethyl, better still methyl.

Among the hydrocarbon chains substituted by a chemical function $Fc^2$ which are represented by the $Rc^2$ symbols in the formulae (III), (III-1), (III-2), (III-3) and (III-4), mention may be made of alkanediyl chains, preferably those comprising at most 6 carbon atoms, more preferentially the 1,3-propanediyl group, the alkanediyl group bearing a substituent, the chemical function $Fc^2$, in other words one valence of the alkanediyl chain for the function $Fc^2$, the other valence for the silicon atom of the methoxysilane function.

In the formulae (III), (III-1), (III-2), (III-3) and (III-4), a chemical function is understood to mean a group which is different from a saturated hydrocarbon group and which may participate in chemical reactions. A person skilled in the art understands that the chemical function $Fc^2$ is a group that is chemically inert with respect to the chemical species present in the polymerization medium. The chemical function $Fc^2$ may be in a protected form, such as for example in the case of the primary amine, secondary amine or thiol function. Mention may be made, as chemical function $Fc^2$, of the ether, thioether, protected primary amine, protected secondary amine, tertiary amine, protected thiol, and silyl functions. Preferably, the chemical function $Fc^2$ is a protected primary amine function, a protected secondary amine function, a tertiary amine function or a protected thiol function. As protecting groups of the primary amine, secondary amine and thiol functions, mention may be made of silyl groups, for example the trimethylsilyl and tert-butyldimethylsilyl groups.

According to any one of the embodiments of the invention, g is preferably other than 0, which means that the functionalizing agent comprises at least one Si-$Rc^2$ bond.

Mention may be made, as functionalizing agent, of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine and 3,3-dimethoxy-8,8,9,9-tetramethyl-2-oxa-7-thia-3,8-disiladecane, preferably dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-penta methyl-2-oxa-7-thia-3,8-disiladecanetrimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane.

The functionalizing agent is typically added to the polymerization medium resulting from step a). It is typically added to the polymerization medium at a degree of conversion of the monomers chosen by a person skilled in the art depending on the desired macrostructure of the copolymer. Since step a) is generally carried out under ethylene pressure, a degassing of the polymerization reactor may be carried out before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of cocatalyst, preferably of from 2 to 4 mol of functionalizing agent per 1 mol of cocatalyst.

The functionalizing agent is bought into contact with the polymerization medium for a time sufficient to enable the functionalization reaction. This contact time is judiciously chosen by a person skilled in the art as a function of the concentration of the reaction medium and of the temperature of the reaction medium. Typically, the functionalization reaction is carried out under stirring, at a temperature ranging from 17° C. to 80° C., for 0.01 to 24 hours.

Once functionalized, the copolymer may be recovered, in particular by isolating it from the reaction medium. The techniques for separating the copolymer from the reaction medium are well known to a person skilled in the art and are chosen by a person skilled in the art depending on the amount of copolymer to be separated, its macrostructure and the tools available to a person skilled in the art. Mention may be made, for example, of the techniques of coagulating the copolymer in a solvent such as methanol, the techniques of evaporating the solvent of the reaction medium and the residual monomers, for example under reduced pressure.

When the functionalizing agent is of formula (III), (III-1) or (III-2) and g is equal to 2, step b) may be followed by a hydrolysis reaction in order to form a copolymer bearing a silanol function at the chain end. The hydrolysis may be carried out by a step of stripping of the solution containing the copolymer at the end of step b), in a manner known to a person skilled in the art.

When the functionalizing agent is of formula (III), (III-1), (III-2), (III-3) and (III-4), when g is other than 0 and when $Rc^2$ represents a hydrocarbon chain substituted by a function $Fc^2$ in a protected form, step b) may also be followed by a hydrolysis reaction in order to deprotect the function at the end of the chain of the copolymer. The hydrolysis reaction, step of deprotecting the function, is generally carried out in an acid or basic medium depending on the chemical nature of the function to be deprotected. For example, a silyl group, in particular trimethylsilyl or tert-butyldimethylsilyl group, which protects an amine or thiol function may be hydrolysed in an acid or basic medium in a manner known to a person skilled in the art. The choice of the deprotection conditions is judiciously made by a person skilled in the art taking into account the chemical structure of the substrate to be deprotected.

Step c) is an optional step depending on whether or not it is desired to convert the functional group into a silanol function or whether or not it is desired to deprotect the protected function. Preferentially, step c) is carried out before separating the copolymer from the reaction medium at the end of step b) or else at the same time as this separation step.

A better understanding of the abovementioned characteristics of the present invention, and also others, will be obtained on reading the following description of several exemplary embodiments of the invention, given by way of illustration and without limitation.

II. EXEMPLARY EMBODIMENTS OF THE INVENTION

II.1—Characterization Methods:

Size Exclusion Chromatography (SEC):

a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Combined with 3 detectors (3D), a refractometer, a viscometer and a 90° light scattering detector, SEC makes it possible to learn the absolute molar mass distribution of a polymer. The various number-average (Mn) and weight-average (Mw) absolute molar masses and the dispersity (Đ=Mw/Mn) can also be calculated.

b) Preparation of the Polymer:

There is no specific treatment of the polymer sample before analysis. Said sample is simply dissolved, in tetrahydrofuran (+1 vol % of diisopropylamine+1 vol % of triethylamine), at a concentration of approximately 1 g/l. The solution is then filtered through a filter with a porosity of 0.45 μm before injection.

c) SEC3D Analysis:

The apparatus used is a Waters Alliance chromatograph. The elution solvent is tetrahydrofuran (+1 vol % of diisopropylamine+1 vol % of triethylamine), the flow rate is 0.5 ml/min, and the system temperature is 35° C. Use is made of a set of four Polymer Laboratories columns in series, two with the "Mixed A LS" trade name and two with the "Mixed B LS" trade name.

The volume of the solution of the polymer sample injected is 100 μl. The detection system used is the TDA 302 from Viscotek, it is composed of a differential refractometer, a differential viscometer and a 90° light scattering detector. For these 3 detectors, the wavelength is 670 nm. For the calculation of the average molar masses, the value of the refractive index increment dn/dC of the polymer solution is integrated, said value being defined beforehand in tetrahydrofuran (+1 vol % of diisopropylamine+1 vol % of triethylamine) at 35° C. and 670 nm. The software for evaluating the data is the Omnisec system from Viscotek.

Nuclear Magnetic Resonance (NMR):

All the functionalization products of the copolymers of ethylene and 1,3-butadiene are characterized by $^1H$, $^{13}C$, $^{29}Si$ NMR spectrometry. The NMR spectra are recorded on a Brüker Avance III 500 MHz spectrometer equipped with a 5 mm BBI Z-grad "broad band" cryoprobe. The quantitative $^1H$ NMR experiment uses a simple 30° pulse sequence and a repetition time of 5 seconds between each acquisition. 64 to 256 accumulations are carried out. The quantitative $^{13}C$ NMR experiment uses a 30° single pulse sequence with a proton decoupling and a repetition time of 10 seconds between each acquisition. 1024 to 10240 accumulations are carried out. Two-dimensional $^1H/^{13}C$ and $^1H/^{29}Si$ experiments are used with the aim of determining the structure of the functional polymers. The determination of the microstructure of the copolymers is defined in the literature, according to the article by Llauro et al., *Macromolecules* 2001, 34, 6304-6311.

The final chemical structure of each functional polymer is identified by $^1H$, $^{13}C$ and $^{29}Si$ NMR.

II.2—Preparation of the Copolymers in Accordance with the Invention:

Raw Materials

All the reactants are obtained commercially except for the metallocene of formula (IV-3a) [{Me$_2$SiFlu$_2$Nd(μ-BH$_4$)$_2$Li (THF)}$_2$] which may be prepared according to the procedure described in document WO 2007054224.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The 1,3-butadiene is purified over alumina guards. The functionalizing agents are used without prepurification.

The dimethoxydimethylsilane (AB111082), the diethoxydimethylsilane (AB111080) and the (N,N-dimethyl-3-aminopropyl)methyldimethoxysilane (AB252529) originate from ABCR, the (N,N-dimethylaminopropyl)trimethoxysilane originates from Nitrochemie. The 3-methoxy-3,8,8,9,9-pentamethyl-2-oxa-7-thia-3,8-disiladecane and the 3,3-methoxy-8,8,9,9-tetramethyl-2-oxa-7-thia-3,8-disiladecane were synthesized.

The methylcyclohexane solvent originating from BioSolve is dried and purified on an alumina column in a solvent purifier originating from mBraun used in an inert atmosphere. The methanol (99%, class 3, grade II) originates from Laurylas, the C$_6$D$_6$ (99.6 atom % D) from Aldrich and is stored at low temperature. All the reactions are carried out in an inert atmosphere.

Equipment

All the polymerizations and the functionalization reactions of copolymers of ethylene and 1,3-butadiene are carried out in a reactor having a disposable 500 ml glass tank (Schott flasks) equipped with a stainless steel stirrer blade. The control of the temperature is ensured by means of a thermostatically-controlled oil bath connected to a polycarbonate jacket. This reactor has all the inlets or outlets necessary for the handling operations.

Polymerization Procedure

A variable quantity of metallocene is introduced into a first Steinie bottle in a glovebox (Table 1).

The butyloctylmagnesium, dissolved beforehand in 300 ml of methylcyclohexane in a second Steinie bottle, is introduced into the first Steinie bottle containing the metallocene in the proportions indicated in Table 1. After 10 minutes of contact at ambient temperature a catalytic solution is obtained. The catalytic solution is then introduced into the polymerization reactor. The temperature in the reactor is then increased to 80° C.

When this temperature is reached, the reaction starts by injection of a gaseous mixture of ethylene and 1,3-butadiene (80/20 mol %) into the reactor. The polymerization reaction takes place at a pressure of 4 bar except for example 7 in which it takes place at a pressure of 8 bar.

Functionalization Procedure

When the desired monomer conversion is achieved, the content of the reactor is degassed then the functionalizing agent is introduced under an inert atmosphere by excess pressure. The reaction medium is stirred for a time and temperature which are indicated in Table 1. After reaction, the medium is degassed then precipitated out in methanol. The polymers are redissolved in toluene, then precipitated out into methanol so as to eliminate the ungrafted "silane" molecules, which makes it possible to improve the quality of the signals of the spectra for the quantification of the functional group content and the integration of the various signals. The polymer is treated with antioxidant then dried at 60° C. under vacuum to constant weight. It is then analyzed by SEC (THF), $^1$H, $^{13}$C, $^{29}$Si NMR.

The functionalizing agents used respectively:

| | |
|---|---|
| (N,N-dimethyl-3-aminopropyl)methyldimethoxysilane | A1 |
| (N,N-dimethyl-3-aminopropyl)trimethoxysilane | A2 |
| dimethyldimethoxysilane | A3 |
| dimethyldiethoxysilane | A4 |
| 3-methoxy-3,8,8,9,9-pentamethyl-2-oxa-7-thia-3,8-disiladecane | A5 |
| 3,3-methoxy-8,8,9,9-tetramethyl-2-oxa-7-thia-3,8-disiladecane | A6 |

The experimental conditions of the functionalization reaction are described in Table 1.

II.3—Results:

The results appear in Table 2.

Independently of the functionalizing agent that is used, the copolymer has an alkoxysilane or silanol functionalization at the chain end. A third, or even half, of the chains may be functionalized, as is the case when the functionalizing agents A1, A2, A3 and A6 are used. In fact, the contents of functional group may reach at least 50%. This functionalization result is noteworthy, since it is achieved despite the chain-transfer reactions that characterize the polymerization carried out for the synthesis of the copolymers.

It is also noted that the methoxysilanes make it possible to obtain a better content of functional groups than the ethoxysilanes and that the trimethoxysilanes lead to the best contents of functional groups.

Rubber compositions, C and 1 respectively, of which the formulation expressed in phr (parts by weight per hundred parts of elastomer) appears in Table 3, were prepared according to the following procedure: the copolymer, the silica, and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then carried out in one step, which lasts in total approximately 3 to 4 min, until a maximum "dropping" temperature of 165° C. is reached. The mixture thus obtained is recovered and cooled and then sulfur and the accelerator are incorporated on a mixer (homofinisher) at 30° C., everything being mixed (productive phase) for approximately ten minutes. The compositions thus obtained are subsequently calendered, either in the form of slabs (thickness of 2 to 3 mm) or of thin sheets of rubber for the measurement of their physical or mechanical properties. Their dynamic properties are measured on a viscosity analyser (Metravib VA4000) according to standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under standard temperature conditions (23° C.) according to standard ASTM D 1349-99, is recorded. A strain amplitude sweep is carried out from 0.1% to 50% (outward cycle) and then from 50% to 0.1% (return cycle). The results made use of are the complex shear modulus G*, the loss factor tan(δ) and the difference in modulus ΔG* between the values at 0.1% and 50% strain (Payne effect). For the return cycle, the maximum value of tan(δ) observed, denoted by tan(δ)max, is indicated.

The complex modulus G* at 50% strain, denoted by G*, the difference in modulus ΔG* between the values at 0.1% and 50% strain (Payne effect) and the value of tan(δ)max are given in base 100, the value 100 being assigned to the control composition (C). The lower the value of ΔG*, the lower the hysteresis of the rubber composition. The lower the value of tan(δ)max, the lower the hysteresis of the rubber composition. The lower the value of G*, the lower the stiffness of the composition.

The response of a sample of composition subjected to a simple alternating sinusoidal shear stress during a temperature sweep, subjected to a sinusoidal stress at an imposed load of 0.7 MPa and at a frequency of 10 Hz, the temperature ranging from −60° C. to 100° C., at a rate of 1.5° C. per minute, is also recorded. The Tg of the mixture is indicated by the temperature of the maximum of tan(δ), denoted "Tg (° C.) tan(δ) max". Another result made use of is the complex dynamic shear modulus (G*), denoted by G* Modulus, for example at 60° C. For greater readability, the G* results will be shown in base 100, the value 100 being assigned to the control. A result of less than 100 indicates a decrease in the value concerned and, conversely, a result of greater than 100 will indicate an increase in the value concerned. For the rubber composition that contains the copolymer in accordance with the invention, a lower hysteresis and also a lower stiffness are noted.

In summary, the process in accordance with the invention makes it possible to attain copolymers which have ethylene units, butadiene units and 1,2-cyclohexanediyl units, and which are alkoxysilane- or silanol-functionalized at the chain end.

TABLE 1

| Example | Metallocene (mol/l) | Cocatalyst (mol/l) | Functionalizing agent nature | Functionalizing agent/cocatalyst ratio | Functionalization time (min) | Functionalization temperature (° C.) |
|---|---|---|---|---|---|---|
| 1 | 0.00015 | 0.00075 | A1 | 2 | 15 | 80 |
| 2 | 0.00016 | 0.00081 | A2 | 4 | 60 | 80 |
| 3 | 0.00017 | 0.00088 | A3 | 4 | 60 | 80 |
| 4 | 0.00017 | 0.00092 | A4 | 4 | 60 | 80 |
| 5 | 0.00016 | 0.0008 | A5 | 4 | 60 | 80 |
| 6 | 0.00016 | 0.0008 | A6 | 4 | 60 | 80 |
| 7 | 0.00007 | 0.0004 | A1 | 4 | 15 | 80 |

TABLE 2

| Example | Mn (g/mol) | Ethylene (mol %) | 1,2-Butadiene (mol %) | 1,4-Butadiene (mol %) | 1,2-Cyclohexanediyl (mol %) | Functional group content (%) |
|---|---|---|---|---|---|---|
| 1 | 30100 | 76.7 | 6 | 5.4 | 11.9 | 33 |
| 2 | 41800 | 78 | 6 | 5 | 11 | 48 |
| 3 | 34400 | 80 | 4 | 4 | 12 | 36 |
| 4 | 34400 | 80 | 4 | 4 | 12 | 24 |
| 5 | 39500 | 79 | 5 | 5 | 11 | 26 |
| 6 | 38500 | 79 | 5 | 5 | 11 | 56 |
| 7 | 139400 | 76.7 | 9 | 5.6 | 8.7 | 35 |

TABLE 3

| Composition (phr) | C | I |
|---|---|---|
| EBR (1) | 100 | — |
| EBR (2) | — | 100 |
| Antioxidant (3) | 2 | 2 |
| Stearic acid | 2 | 2 |
| ZnO | 1 | 1 |
| Accelerator (4) | 2 | 2 |
| Sulfur | 1 | 1 |
| N234 | 3 | 3 |
| Silica (5) | 55 | 55 |
| Antiozone wax | 1.6 | 1.6 |
| Silane (6) | 4 | 4 |
| DPG (7) | 1.5 | 1.5 |
| Properties in the cured state | | |
| ΔG* 23° C. | 100 | 51 |
| Tanδ max 23° C. | 100 | 82 |
| G* 23° C. | 100 | 79 |
| Modulus G* | 100 | 88 |

(1) Copolymer of ethylene and 1,3-butadiene with 79 mol % of ethylene units and 7 mol % of 1,2-cyclohexanediyl units (non-functional)
(2) Copolymer of ethylene and 1,3-butadiene with 77 mol % of ethylene units and 9 mol % of 1,2-cyclohexanediyl units which is functionalized at the chain end, functional group content 35%, functionalizing agent (N,N-dimethyl-3-aminopropyl)methyldimethoxysilane
(3) N-(1,3-Dimethylbutyl)-N'-phenyl-p-phenylenediamine (Santoflex 6-PPD from Flexsys)
(4) N-cyclohexyl-2-benzothiazolesulfenamide (Santocure CBS from Flexsys)
(5) Zeosil 1165 MP, Solvay-Rhodia, in the form of micropearls
(6) TESPT (Si69), Evonik-Degussa
(7) Diphenylguanidine

The invention claimed is:

1. An ethylene/1,3-butadiene copolymer comprising: ethylene units, butadiene units, and UD units of cyclic structure of formula (I):

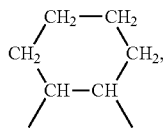
(I)

and the copolymer bearing, at one of its chain ends, an alkoxysilyl-containing or a silanol-containing functional group $F^1$.

2. The ethylene/1,3-butadiene copolymer according to claim 1, in which the ethylene units represent at least 50 mol % of all of the monomer units of the copolymer.

3. The ethylene/1,3-butadiene copolymer according to claim 1, in which the copolymer contains UA, UB, UC, UD units and optional UE units, the UA, UB, UC, UD, and UE units having the following formulas:

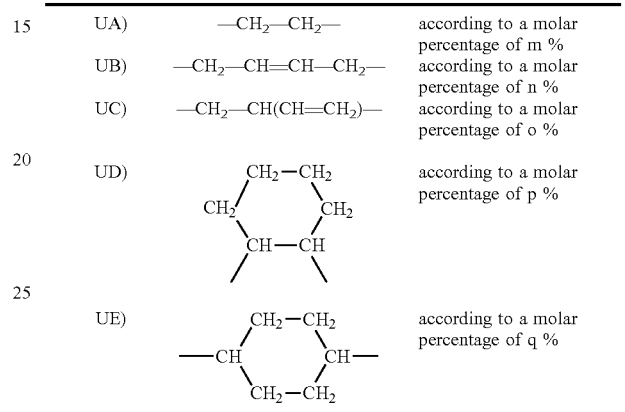

m, n, o, p and q ranging from 0 to 100,
m≥50
n+o>0
p>0
q≥0,
the respective molar percentages of m, n, o, p and q being calculated on the basis of the sum of m+n+o+p+q, which is equal to 100.

4. The ethylene/1,3-butadiene copolymer according to claim 3, in which:
0<o+p≤25
o+p+q≥5
n+o>0
q≥0,
the respective molar percentages of m, n, o, p and q being calculated on the basis of the sum of m+n+o+p+q, which is equal to 100.

5. The ethylene/1,3-butadiene copolymer according to claim 3, in which q is equal to 0.

6. The ethylene/1,3-butadiene copolymer according claim 1, in which the functional group $F^1$ is attached directly via a covalent bond to the terminal unit of the copolymer.

7. The ethylene/1,3-butadiene copolymer according to claim 6, in which the terminal unit to which the functional group $F^1$ is directly attached consists of a methylene bonded to an ethylene unit or to a UD unit, the Si atom being bonded to the methylene.

8. The ethylene/1,3-butadiene copolymer according to claim 1, in which the functional group $F^1$ is of formula (III-a) or formula (III-b):

$$Si(OR^1)_{3-f}(R^2)_f \quad \text{(III-a)}$$

$$Si(OH)(R^2)_2, \quad \text{(III-b)}$$

in which:
the $R^1$ symbols, which are identical or different, represent an alkyl, the R² symbols, which are identical or different, represent a hydrogen atom, a hydrocarbyl or a hydrocarbyl substituted by a chemical function F², the chemical function F² is a primary, secondary or tertiary amine function or a thiol function, the primary or secondary amine or thiol function being protected by a silyl group or being unprotected, and f is an integer ranging from 0 to 2.

9. The ethylene/1,3-butadiene copolymer according to claim 8, in which the R¹ symbols represent an alkyl having at most 6 carbon atoms.

10. The ethylene/1,3-butadiene copolymer according to claim 8, in which the R² symbols represent an alkyl having at most 6 carbon atoms or an alkanediyl chain having at most 6 carbon atoms and substituted by the chemical function F².

11. The ethylene/1,3-butadiene copolymer according to claim 8, in which the alkyl represented by the R¹ and R² symbols is a methyl or an ethyl.

12. The ethylene/1,3-butadiene copolymer according to claim 1, in which the functional group F¹ is dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethysilyl, 3-(N,N-dimethylamino)propylmethoxymethylsilyl, 3-(N,N-dimethylamino)propylmethoxyethylsilyl, 3-(N,N-dimethylamino)propylethoxymethylsilyl, 3-(N,N-dimethylamino)propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl, or 3-thiopropylethoxyethylsilyl, or the amine or thiol function of 3-aminopropyldimethoxysilyl protected by a silyl group, 3-aminopropyldiethoxysilyl, 3-thiopropyldimethoxysilyl, 3-thiopropyldiethoxysilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl, or 3-thiopropylethoxyethylsilyl.

13. The ethylene/1,3-butadiene copolymer according to claim 1, in which the functional group F¹ is dimethylsilanol, diethylsilanol, 3-(N,N-dimethylamino)propylmethylsilanol, 3-(N,N-dimethylamino)propylethylsilanol, 3-aminopropylmethylsilanol, 3-aminopropylethylsilanol, 3-thiopropylethylsilanol, or 3-thiopropylmethylsilanol, or the amine or thiol function of 3-aminopropylmethylsilanol protected by a silyl group, 3-aminopropylethylsilanol, 3-thiopropylethylsilanol, or 3-thiopropylmethylsilanol.

14. The ethylene/1,3-butadiene copolymer according to claim 8, in which the functional group F¹ is of formula (III-a) in which f is equal to 1.

15. A process for preparing a copolymer defined according to claim 1, which process comprises the following steps:
a) the copolymerization of a monomer mixture of ethylene and 1,3-butadiene in the presence of a catalytic system comprising an organomagnesium compound and a metallocene comprising the moiety of formula (II)

$$P^1(Cp^1)(Cp^2)Met \qquad (II)$$

in which:
Met is a group 4 metal atom or a rare-earth metal atom,
P¹ is a group that bridges the two groups Cp¹ and Cp², and that comprises a silicon or carbon atom,
Cp¹ and Cp², which are identical or different, are components selected from the group consisting of a fluorenyl group, substituted fluorenyl groups, a cyclopentadienyl group, substituted cyclopentadienyl groups, an indenyl group and substituted indenyl groups, b) the reaction of a functionalizing agent represented by a compound of formula (III), with the copolymer obtained in step a),

$$Si(Fc^1)_{4-g}(Rc^2)_g \qquad (III)$$

the Fc¹ symbols, which are identical or different, representing an alkoxy group or a halogen atom,
the Rc² symbols, which are identical or different, representing a hydrogen atom, a hydrocarbon chain or a hydrocarbon chain substituted by a chemical function Fc²,
the chemical function Fc² is a primary amine function protected by a silyl group, a secondary amine function protected by a silyl group, a tertiary amine function, or a thiol function protected by a silyl group,
g being an integer ranging from 0 to 2, and
c) optionally a hydrolysis reaction.

16. The process according to claim 15, in which the metallocene is of formula (II-1)

$$\{P^1(Cp^1)(Cp^2)Met\text{-}G\}_b \qquad (II\text{-}1)$$

in which
Met represents a rare-earth metal atom,
the G symbol denoting a halogen atom X selected from the group consisting of chloride, fluoride, bromide and iodide, or a group comprising the borohydride moiety BH₄,
b is equal to 1 or 2.

17. The process according to claim 16, in which the G symbol denotes chloride or the group of formula (IV)

$$(BH_4)_{(1+c)}\text{-}L_c\text{-}N_x \qquad (IV)$$

in which
L represents an alkali metal atom selected from the group consisting of lithium, sodium and potassium,
N represents a molecule of an ether,
x is equal to or greater than 0,
c, an integer, is equal to or greater than 0.

18. The process according to claim 15, in which the Met symbol represents a neodymium atom.

19. The process according to claim 15, in which P¹ denotes the SiMe₂ group.

20. The process according to claim 15, in which Cp¹ and Cp² are identical and are selected from the group consisting of indenyl groups substituted at position 2, substituted fluorenyl groups and the fluorenyl group.

21. The process according to claim 15, in which Cp¹ is different from Cp², Cp¹ is selected from the group consisting of substituted fluorenyl groups and the fluorenyl group, and Cp² is selected from the group consisting of cyclopentadienyl groups substituted at least at positions 2 & 5, indenyl groups substituted at least at position 2, substituted fluorenyl groups and the fluorenyl group.

22. The process according to claim 15, in which Cp¹ and Cp² each represent a substituted fluorenyl group or a fluorenyl group.

23. The process according to claim 15, in which the metallocene is selected from the group of metallocenes consisting of [Me$_2$SiFlu$_2$Nd(μ-BH$_4$)$_2$Li(THF)}$_2$], [Me$_2$SiFlu$_2$Nd(μ-BH$_4$)(THF)], [Me$_2$SiFlu$_2$Nd(μ-BH$_4$)], [Me$_2$Si(2-MeInd)$_2$Nd(μ-BH$_4$)], [Me$_2$Si(C$_5$Me$_4$)(Flu)Nd(μ-BH$_4$)], [Me$_2$SiFlu$_2$Nd(μ-BH$_4$)$_2$Li(THF)], [Me$_2$SiFlu$_2$Nd(μ-BH$_4$)(THF)}$_2$] and [Me$_2$SiFlu$_2$Nd(Cl)], the Flu symbol representing the fluorenyl group $C_{13}H_8$, the Ind symbol representing the indenyl group, the 2-MeInd symbol representing the indenyl group substituted by a methyl at position 2.

24. The process according to claim 15, in which the metallocene is of formula (IV-3a), (IV-3b), (IV-3c), (IV-3d) or (IV-3e)

[{Me$_2$SiFlu$_2$Nd(μ-BH$_4$)$_2$Li(THF)}2]　　(IV-3a)

[Me$_2$SiFlu$_2$Nd(μ-BH$_4$)$_2$Li(THF)]　　(IV-3b)

[Me$_2$SiFlu$_2$Nd(μ-BH$_4$)(THF)]　　(IV-3 c)

[{Me$_2$SiFlu$_2$Nd(μ-BH$_4$)(THF)}2]　　(IV-3d)

[Me$_2$SiFlu$_2$Nd(μ-BH$_4$)],　　(IV-3 e)

the Flu symbol representing the fluorenyl group $C_{13}H_8$.

25. The process according to claim 15, in which the organomagnesium compound is a dialkylmagnesium compound or an alkylmagnesium halide.

26. The process according to claim 15, in which at least one of the Fc' symbols represents an alkoxy group.

27. The process according to claim 15, in which at least two of the Fc' symbols represent an alkoxy group.

28. The process according to claim 15, in which at least three of the Fc' symbols represent an alkoxy group.

29. The process according to claim 15, in which the alkoxy group is a methoxy or an ethoxy.

30. The process according to claim 15, in which the Rc$^2$ symbols represent an alkyl having at most 6 carbon atoms or an alkanediyl chain having at most 6 carbon atoms and substituted by the chemical function Fc$^2$.

31. The process according to claim 30, in which the alkyl having at most 6 carbon atoms is methyl or ethyl.

32. The process according to claim 15, in which the silyl group is a trimethylsilyl or tert-butyldimethylsilyl.

33. The process according to claim 15, in which the functionalizing agent is dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyl-dimethoxysilane, (N,N-dimethyl-3-aminopropyl) ethyldiethoxysilane, 3-methoxy-3,8,8,9,9-pentamethyl-2-oxa-7-thia-3,8-di siladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine, or 3,3-dimethoxy-8,8,9,9-tetramethyl-2-oxa-7-thia-3,8-disiladecane.

* * * * *